Nov. 16, 1926. 1,606,880
J. A. LE CAIN
FEED WATER HEATER
Filed Sept. 12, 1924    2 Sheets-Sheet 2
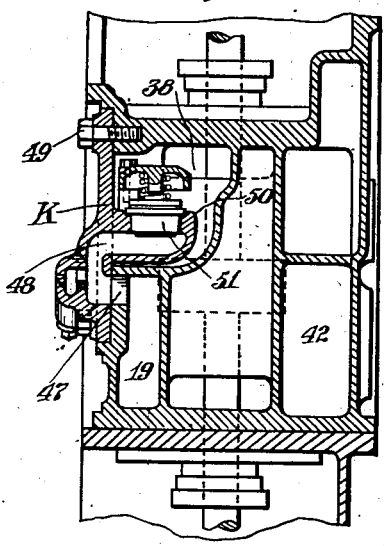
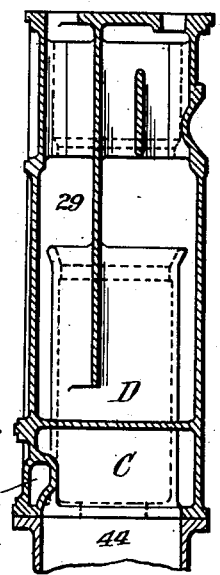
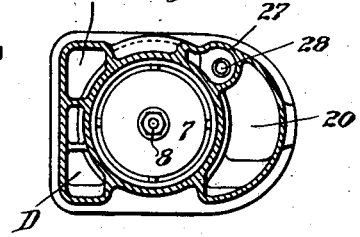
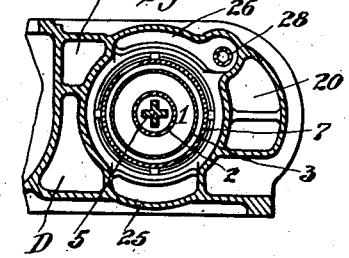
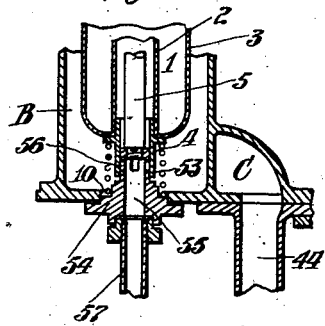
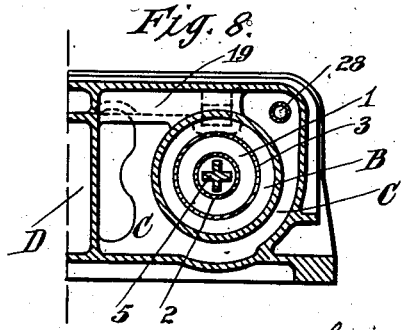
Inventor
John A Le Cain
By his Attorneys Patented Nov. 16, 1926.

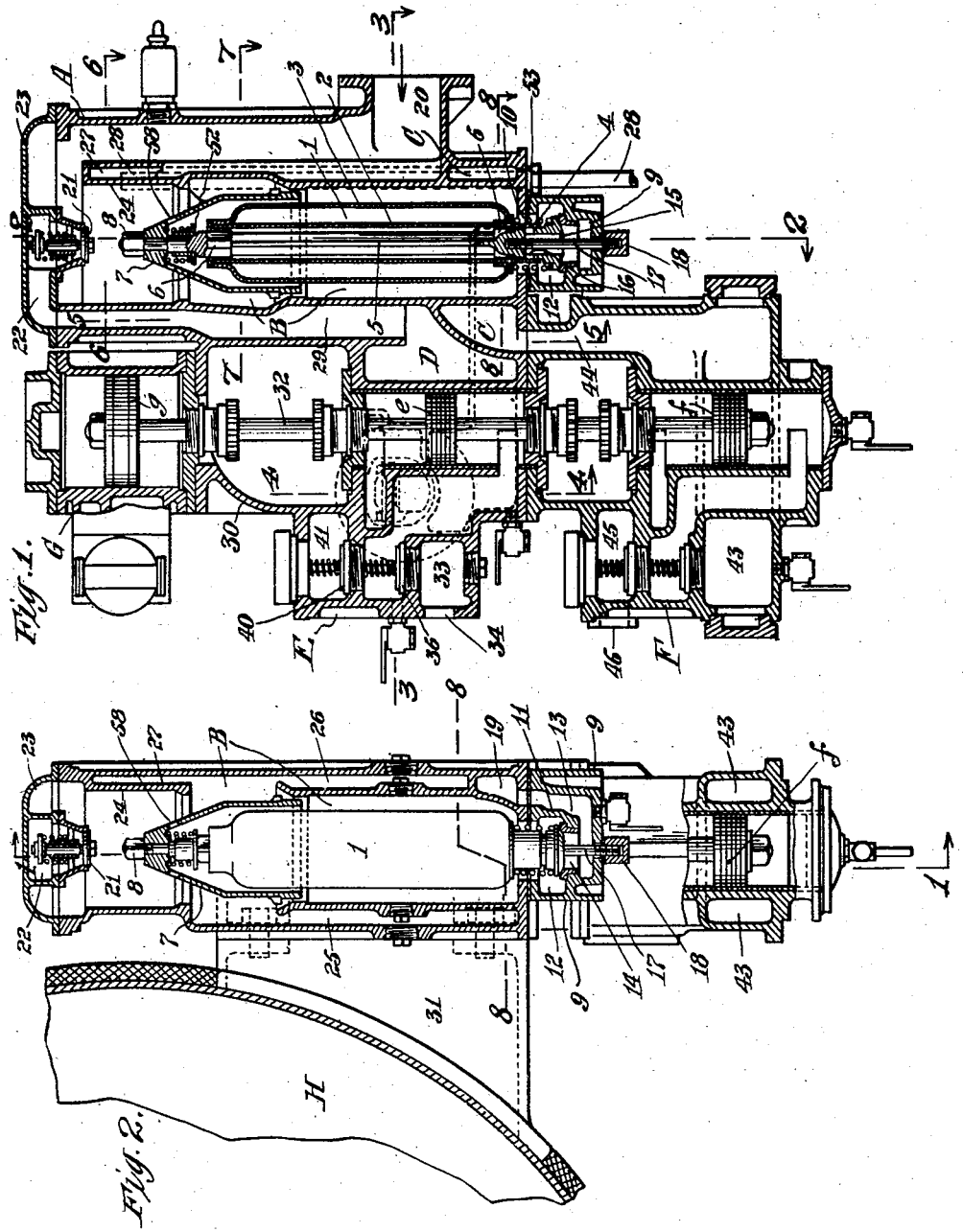

1,606,880

UNITED STATES PATENT OFFICE.

JOHN A. LE CAIN, OF MALDEN, MASSACHUSETTS, ASSIGNOR TO WORTHINGTON PUMP AND MACHINERY CORPORATION, OF NEW YORK, N. Y., A CORPORATION OF VIRGINIA.

FEED-WATER HEATER.

Application filed September 12, 1924. Serial No. 737,242.

This invention relates to feed water heaters for locomotive use and especially to such a system as is described and claimed in United States Letters Patent 1,350,322, patented August 24, 1920, by T. C. McBride.

The especial object of the invention is to provide a simple, compact and efficient heater, and further to provide an improved float control of the excess water especially adapted to withstand the splashing and vibration attending such service.

For a full understanding of the invention a detailed description of constructions embodying all of the features of the invention in their preferred form will now be given in connection with the accompanying drawings and the features forming the invention then specifically pointed out in the claims.

In the drawings—

Figure 1 is a sectional elevation of a complete unit in its preferred form;

Figures 2, 3, 4, 5, 6, and 7 are sections on, respectively, lines 2—2, 3—3, 4—4, 5—5, 6—6 and 7—7 of Figure 1;

Figure 8 is a section on lines 8—8 of Figures 1 and 2, and

Figure 9 is a sectional detail view of a modification.

Referring to the drawings, A is the heat exchange chamber, or heater proper, receiving steam from steam connection 20 and cold water from one or more atomizing spray nozzles 21 to which cold water is supplied by passage 22 formed in separable head 23 which covers chamber A. The wall of heat exchange chamber A is shaped to form a baffle 24 which aids in distributing the steam and procures a better mingling of the steam and cold water. The condensed steam and heated water pass through the baffle 24 directly into a float chamber B so that the float chamber B is immediately filled to normal level on starting operation, and remains filled thereafter, which is important for the proper control of the water level in the heater and the delivery of excess water. The heated water passes from float chamber B through cored passages 25 and 26 on opposite sides thereof to a storage chamber C formed about the lower end of the float chamber B. The above is the operation with the plugs closing the holes in the side wall of the float chamber. The construction may also be used with these holes open and the normal level of the water and discharge of excess water determined by the position of these holes, the float being formed and weighted according to the method of operation.

In order to discharge any air collecting in the heater and prevent its becoming air bound, I provide an air removal passage 27 extending upward from float chamber B and formed between the baffle 24 and the outer wall of the heater, as clearly shown in Figure 2. The upper end of the passage 27 is closed and air is discharged therefrom in any suitable manner, as through pipe 28 secured to the bottom of storage chamber C and extending upward through cored passage 26 into the passage 27, preferably well above any possible water level in the heater. At one side of the chambers A, B, and C is located the cold water supply and air chamber D which is connected by passage 29 to passage 22 for delivery of cold water to the spray nozzle 21, the lower end of the passage 29 being located, preferably, well below the water level in chamber D for separation of any air which may be brought into the chamber D with the water, and for sealing the air in chamber D. The chambers A, B, C and D are preferably formed in a single compact casting as shown, with cover plate or head 23 secured thereto.

At one side of this casting are located the cold water supply pump E and the hot water feed pump F arranged in line vertically and operated by a single direct acting steam engine G of common type supported on a shelf 30, the shelf 30 and the cold water supply pump E being preferably cast integrally with the heater casting and the hot water feed pump F forming a separate casting secured thereto to form therewith a single unit which is conveniently attached to and supported from the side of the locomotive boiler H by a bracket 31 secured to the heater casting. The pumps E and F are shown as double acting pumps of a common type, having their pistons $e$, $f$ carried by the rod 32 actuated by the steam piston $g$. Cold water is supplied to the suction chamber 33 of the cold water supply pump E through port 34 and is drawn by the pump plunger $e$ through suction valves 35, 36 which are separated by a partition 37 providing two pulsation passages 38, 39 connecting respectively with the upper and lower ends of the pump E. Above the suction valves 35, 36 are mounted suitable discharge valves 40 through which the cold water passes to discharge chamber 41 connected by passage 42 to cold water supply chamber D. The hot water feed pump F differs only in that its suction chamber 43 is extended around the pump cylinder for connection by passage 44 to the storage tank C and the hot feed water discharged thereby passes from discharge chamber 45 through connection 46 to the locomotive boiler.

The water level in the heater and the delivery of the excess water is controlled by a float which is constructed and arranged to withstand the vibration and splashing incident to locomotive use. In accordance with my invention I provide a closed float 1, preferably tubular in shape and rather elongated, formed by annular plates 2 and 3 secured together at their upper and lower ends, and with a suitable valve carried thereby, which may be formed by extending the inner plate 2 beyond the lower end of the float 1 to form a sleeve valve 4. A rigid guide rod or stem 5 passes through the tubular float 1 and is provided with wings 6 engaging the upper and lower ends of the float to guide and steady the float in its movements. In order to protect the float 1 from the descending water and reduce to a minimum the splashing of this water, a hood 7 is secured by nut 8 to the upper end of the stem 5 and extends downward over the upper end of the float 1 within the float chamber B, preferably to a point well below the normal level of the water, and with its wall in close proximity to the wall of the float chamber B so as to form therewith a contracted annular nozzle directing the descending heated water along the wall of the float chamber B and away from the float 1. Communication is established between the interior of the hood 7 and the heat exchange chamber A by one or more ports 58 for equalization of pressure therein.

In the preferred construction shown in Figures 1–8 inclusive, the excess water is returned directly to one of the pulsation passages of the cold water supply pump E through one or more especial suction valves, preferably so arranged as to be readily accessible for adjustment, cleaning and repairs. For this purpose an excess flow control valve chamber 9 is secured below the float chamber B and connects therewith through a suitable opening 10 in the bottom thereof. A partition 11 divides the chamber 9 into a valve chamber 12 and an excess flow passage 13 connected by a port 14. The lower end of the stem 5 is hollow providing a passage 15 open at its lower end to the port 14 and connected by ports 16 with valve chamber 12. The stem 5 is suitably flanged to seat against the port 14 to which it is securely held by a tie rod 17 secured at its upper end to the stem 5 and having its lower end extending through the bottom of chamber 9 and secured by a nut 18. Passage 13 connects with a passage 19 extending across the bottom of the heater and cold water pump casting and connecting with a port 47 registering with a passage 48 in a removable cover plate K secured to the side of the cold water pump E by bolts 49. Passage 48 is extended inwardly within a projection 50, extending within the pulsation passage 38 of the cold water pump E, the upper wall of the projection 50 being ported to receive one or more excess return flow check valves 51.

In operation, upon an excess of water in the heater, the upward movement of the float 1 raises sleeve valve 4 uncovering ports 16 in the stem 5 and allowing the excess water to pass through passages 15, 13, 19, port 47 and passage 48, whence it is drawn through excess flow check valve 51 to pulsation passage 38 by the downward movement of the cold water supply pump plunger e. This operation continues until the water level has been reduced sufficiently to allow the descent of float 1 to lower the valve 4 sufficiently to close ports 16 whereupon the normal operation of the heater is resumed. The raising and lowering movements of the float 1 are preferably cushioned respectively by a spring pressed collar 52 and a spring 53.

In the modification shown in Figure 9, the opening 10 in the bottom of the float chamber B is closed by a suitable plug 54 provided with a passage 55 connected to the interior of the float tank B by ports 56, the upper end of the plug 54 being closed by the stem 5 which is secured thereto by being threaded therein. A pipe 57, suitably secured to the plug 54, conducts the excess water directly from the float chamber B to the suction of the cold water supply pump E and preferably to a point lower than the lowest possible water level in the locomotive tender so as to provide a water seal thereon.

It will be seen that the heavy closed float having only a small portion thereof projecting above the water level, together with its firm guiding at both ends by the rigid guide stem and its protection from falling and splashing water by the hood, provides a float control especially adapted to meet the requirements of locomotive use.

A further advantage of this control which is especially important, resides in the fact that when there is no water in the heater, whether due to a sudden reduction in the heater pressure resulting in the flashing of the water or from any other cause, the excess water passage connecting with the suction of the cold water supply pump is so closed that steam cannot possibly pass thereto and destroy its vacuum and cause it to pound.

It will be understood that the invention is not to be limited to the specific arrangements shown as these may be modified within the invention defined by the claims.

What I claim is:

1. In a feed water heating apparatus, the combination with means for delivering water to and from the heater, of a float chamber, a closed elongated annular float in said chamber, a rigidly mounted guide stem extending through the float, a hood extended downwardly within the float chamber about the upper end of the float, and valve means operated by the float to control the water level in the heater.

2. In a feed water heating apparatus, the combination with means for delivering water to and from the heater, of a float chamber, a closed float in said chamber, rigid means for guiding said float, a hood extended downwardly within the float chamber about the upper end of the float and forming a narrow water passage between it and the chamber wall, and valve means operated by the float to control the water level in the heater.

3. In a feed water heating apparatus, the combination with means for delivering water to and from the heater, of a float chamber, a closed float in said chamber, rigid means for guiding said float, a hood over said float and extended downwardly within the float chamber below the normal water level therein, means for cushioning the movement of the float, and valve means operated by the float to control the water level in the heater.

4. In a feed water heating apparatus, the combination with means for delivering water to and from the heater, of a float chamber, a closed float in said chamber, rigid means for guiding the float, a passage for delivering excess water from the heater, and valve means operated by the float to control said passage and maintain said passage closed against the escape of steam when the float is lowered.

5. In a feed water heating apparatus, the combination with supply and feed pumps delivering fixed quantities of water to and from the heater, of a float chamber, a closed annular float in said chamber, a rigid guide stem extending through the float, a hood carried by the upper end of the guide stem and extended downwardly about the float below the normal water level in the float chamber, one or more ports in the hood connecting the space within the upper end of the hood with the heater chamber, a connection for delivering excess water due to steam condensation from the heater, and a valve carried by said float for controlling the inlet to said connection.

6. In a feed water heating apparatus, the combination with supply and feed pumps delivering fixed quantities of water to and from the heater, of a float chamber, a closed elongated annular float in said chamber, a rigid guide stem extending through the float, a hood secured to the upper end of the guide stem and extended downwardly about the float below the normal water level in the float chamber, one or more ports in the hood connecting the space within the upper end of the hood with the float chamber, means for cushioning the movements of the float, a connection for delivering excess water due to steam condensation from the heater, and a sleeve valve carried by the float for controlling the inlet to said connection.

7. In a feed water heating apparatus, the combination with supply and feed water pumps delivering fixed quantities of water to and from the heater, of an excess water passage from the heater direct to the supply pump, a non-return valve or valves controlling the inlet of said excess water to the pulsation passage of the supply pump separately from the supply water, and means removably secured to the supply pump for supporting said valve within the pulsation passage of the supply pump.

8. In a feed water heating apparatus, the combination with supply and feed water pumps delivering fixed quantities of water to and from the heater, of an excess water passage from the heater direct to the supply pump, a removable cover plate on the supply pump having a passage registering with said excess water passage and extended within the pulsation passage of the supply pump to deliver the excess water separately from the supply water, and a non-return flow valve or valves carried by the removable cover plate and controlling the inlet of said excess water to the supply pump pulsation passage.

9. A feed water heater unit having an upper section comprising a heat exchange chamber, a float chamber forming a continuation of the heat exchange chamber, a storage chamber formed about the lower end of the float chamber, and a cold water supply pump all cast integrally, a lower section suspended from the upper section and comprising a hot water feed pump, and means for attachment of the upper section to a locomotive boiler for support of the unit by the upper section.

10. A feed water heater unit having an upper section comprising a heat exchange chamber, a float chamber forming a continuation of the heat exchange chamber, a storage chamber surrounding the lower end of the float chamber, a combined cold water supply and air chamber at one side of the heat exchange and float chambers and extended downwardly over the storage chamber, and a cold water supply pump all cast integrally, a lower section suspended from the upper section and comprising a hot water feed pump, a suction chamber surrounding the lower end of the feed pump, and a passage connecting the suction chamber with the storage chamber cast integrally, and means for attachment of the upper section to a locomotive boiler for support of the unit by the upper section.

11. A feed water heater unit having an upper section comprising a heat exchange chamber, a float chamber forming a continuation of the heat exchange chamber, a storage chamber formed about the lower end of the float chamber, and a cold water supply pump all rigidly connected, a lower section suspended from the upper section and comprising a hot water feed pump, and means for attachment of the upper section to a locomotive boiler for support of the unit by the upper section.

12. A feed water heater unit having an upper section comprising a heat exchange chamber, a float chamber forming a continuation of the heat exchange chamber, a storage chamber surrounding the lower end of the float chamber, a combined cold water supply and air chamber at one side of the heat exchange and float chambers and extended downwardly over the storage chamber, and a cold water supply pump all cast integrally, a lower section comprising a hot water feed pump, a suction chamber surrounding the lower end of the feed pump, and a passage connecting the suction chamber with the storage chamber cast integrally, and means for attachment of the upper setion to a locomotive boiler for support of the unit by the upper section.

13. In a feed water heating apparatus, the combination with supply and feed pumps delivering fixed quantities of water to and from the heater, of a float chamber, a closed float in said chamber, a hood over said float and extended downwardly within the float chamber below the normal water level therein, one or more ports in the hood connecting the space within the upper end of the hood with the heater chamber, and valve means operated by the float to control the water level in the heater.

14. A feed water heater unit having an upper section comprising a heat exchange chamber, a float chamber, a hot water storage chamber, a cold water supply and air chamber, and a cold water supply pump all rigidly connected, a lower section suspended from the upper section and comprising a hot water feed pump, and means for attachment of the upper section to a locomotive boiler for support of the unit by the upper section.

15. In a feed water heating apparatus, the combination with supply pump E and feed water pump F delivering water to and from the heater, of excess water passage 19 from the heater direct to supply pump E, removable cover plate K on supply pump E having passage 48 registering with excess water passage 19 and extended within pulsation passage 38 of supply pump E to deliver the excess water separately from the supply water, and non-return flow valve or valves 51 carried by removable cover plate K and controlling the inlet of said excess water to the pulsation passage 38 of supply pump E.

16. In a feed water heating apparatus, the combination with supply and feed water pumps delivering fixed quantities of water to and from the heater, of a heat exchange chamber, float chamber B forming a continuation of the heat exchange chamber, excess float control valve chamber 9 separate from and removably secured at the bottom of float chamber B and passage 19 connecting the excess float control valve chamber 9 with the cold water supply pump.

In testimony whereof, I have hereunto set my hand.

JOHN A. LE CAIN.